United States Patent
Blashewski

(10) Patent No.: US 12,126,388 B2
(45) Date of Patent: Oct. 22, 2024

(54) FORWARD AND REVERSE TEST POINT CIRCUIT WITH SWITCHABLE TERMINATION FOR USE IN AN RF AMPLIFIER

(71) Applicant: Applied Optoelectronics, Inc., Sugar Land, TX (US)

(72) Inventor: Steven Blashewski, Duluth, GA (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 160 days.

(21) Appl. No.: 17/901,282

(22) Filed: Sep. 1, 2022

(65) Prior Publication Data
US 2024/0080110 A1   Mar. 7, 2024

(51) Int. Cl.
*H04B 17/00* (2015.01)
(52) U.S. Cl.
CPC .............. *H04B 17/0085* (2013.01)
(58) Field of Classification Search
CPC .................................... H04B 17/0085
USPC .......................... 375/224; 455/67.14
See application file for complete search history.

(56) References Cited

U.S. PATENT DOCUMENTS

| 6,198,498 | B1* | 3/2001 | Brickell | H04N 21/6168 |
| | | | | 348/E17.001 |
| 6,769,133 | B1 | 7/2004 | Blashewski et al. | |
| 2005/0232256 | A1* | 10/2005 | White | H04L 41/0846 |
| | | | | 370/360 |
| 2008/0160919 | A1* | 7/2008 | Hasegawa | H04W 24/06 |
| | | | | 455/67.11 |
| 2011/0006841 | A1* | 1/2011 | Wyse | H03F 3/72 |
| | | | | 330/124 R |
| 2020/0259573 | A1* | 8/2020 | Horsfield | H04B 17/17 |
| 2021/0341532 | A1* | 11/2021 | Sun | G01R 31/2844 |

* cited by examiner

*Primary Examiner* — Don N Vo
(74) *Attorney, Agent, or Firm* — Grossman Tucker Perreault & Pfleger, PLLC; Norman S. Kinsella

(57) ABSTRACT

A forward and reverse test point circuit with a switchable termination may be used to provide testing of forward and reverse RF signals in an RF amplifier before and/or after amplification. The switchable forward and reverse test point circuit includes at least one switchable termination circuit coupled between forward and reverse terminals of a directional coupler and at least one test point. During forward signal testing, the forward terminal is switched to the at least one test point and the reverse terminal is switched to a termination. During reverse signal testing, the reverse terminal is switched to the at least one test point and the forward terminal is switched to a termination. The RF amplifier including the switchable forward and reverse test point circuit may be used in a hybrid fiber-coaxial (HFC) network delivering CATV services and may be capable of amplifying RF signals up to 1.8 GHz.

9 Claims, 3 Drawing Sheets

FORWARD AND REVERSE TEST POINT CIRCUIT WITH SWITCHABLE TERMINATION FOR USE IN AN RF AMPLIFIER

TECHNICAL FIELD

The present disclosure relates to RF amplifiers and more particularly, to a forward and reverse test point circuit with a switchable termination used in an RF amplifier.

BACKGROUND INFORMATION

RF amplifiers are used to amplify RF signals in communication systems, such as a CATV system that provides both downstream (forward) signals to subscriber locations and upstream (reverse) signals from subscriber locations. In a hybrid fiber-coaxial (HFC) network providing CATV services, for example, optical communication is provided over optical fibers between a headend/hub and an optical node and electrical RF communication is provided over coaxial cables between the optical node and the subscriber locations. In such HFC networks, RF amplifiers are used after the optical node to extend the transmission distance of the RF signals and thus extend the reach of the CATV services provided to subscriber locations.

RF amplifiers often include test points that allow access to the forward and reverse signals, for example, to analyze the signals and assess any problems or failures in the communication system. Because of the limited space within the amplifier housings and on the circuit boards in the RF amplifiers, efforts have been made to provide the testing with fewer circuit components. One example is the termination circuitry for dual forward and reverse test points described in U.S. Pat. No. 6,769,133, which is fully incorporated herein by reference. As the bandwidth of communication systems continues to increase and the RF amplifiers are required to handle higher frequencies (e.g., up to 1.8 GHz), such termination circuitry may not work, particularly at higher frequencies in the reverse direction. Also, the space is even further limited in upgraded RF amplifiers for higher bandwidth communications.

SUMMARY

Consistent with one aspect of the present disclosure, a switchable forward and reverse test point circuit includes a directional coupler configured to be coupled to an electrical path on which both forward and reverse RF signals travel. The directional coupler includes a forward terminal configured to split off a portion of the forward RF signal and a reverse terminal configured to split off a portion of the reverse RF signal. The switchable forward and reverse test point circuit also includes at least one test point configured to provide access to at least one of the forward and reverse signals via the forward and reverse terminals and at least one switchable termination circuit coupled between the forward and reverse terminals of the directional coupler and the at least one test point. The switchable termination circuit is configured, during forward signal testing, to switch the forward terminal to the at least one test point and to switch the reverse terminal to a termination. The switchable termination circuit is configured, during reverse signal testing, to switch the reverse terminal to the at least one test point and to switch the forward terminal to a termination.

Consistent with another aspect of the present disclosure, an RF amplifier is provided for a communication system that transmits forward and reverse RF signals. The RF amplifier includes a first port for receiving a forward signal and for outputting a reverse signal, a second port for outputting the forward signal and for receiving the reverse signal, a first diplex filter coupled to the first port for filtering signals at the first port to separate the forward signal for amplification, a second diplex filter coupled to the second port for filtering signals at the second port to separate the reverse signal for amplification, a first gain stage coupled between the first and second diplex filters for amplifying the forward signal, and a second gain stage coupled between the first and second diplex filters for amplifying the reverse signal. The RF amplifier further includes at least one directional coupler coupled to at least one of the first port and the second port and at least one switchable forward and reverse test point circuit coupled to forward and reverse terminals of the directional coupler. The switchable forward and reverse test point circuit includes at least one test point and a switchable termination circuit configured to switch the forward and reverse terminals of the directional coupler between a termination and the at least one test point.

BRIEF DESCRIPTION OF THE DRAWINGS

These and other features and advantages will be better understood by reading the following detailed description, taken together with the drawings wherein.

DETAILED DESCRIPTION

A forward and reverse test point circuit with a switchable termination, consistent with embodiments of the present disclosure, may be used to provide testing of forward and reverse RF signals in an RF amplifier before and/or after amplification. The switchable forward and reverse test point circuit includes at least one switchable termination circuit coupled between forward and reverse terminals of a directional coupler and at least one test point. During forward signal testing, the switchable termination circuit switches the forward terminal to the at least one test point and switches the reverse terminal, which is not being used, to a termination. During reverse signal testing, the switchable termination circuit switches the reverse terminal to the at least one test point and switches the forward terminal, which is not being used, to a termination.

The RF amplifier including the switchable forward and reverse test point circuit may be used in a hybrid fiber-coaxial (HFC) network delivering CATV services and may be capable of amplifying RF signals up to 1.8 GHz. Providing the switchable termination allows the test circuit to handle reverse signals at higher frequencies, for example, up to 600 MHz.

As used herein, the term "coupled" refers to any connection, coupling, link or the like between elements. Such "coupled" elements are not necessarily directly connected to one another and may be separated by intermediate components.

Figure 1:
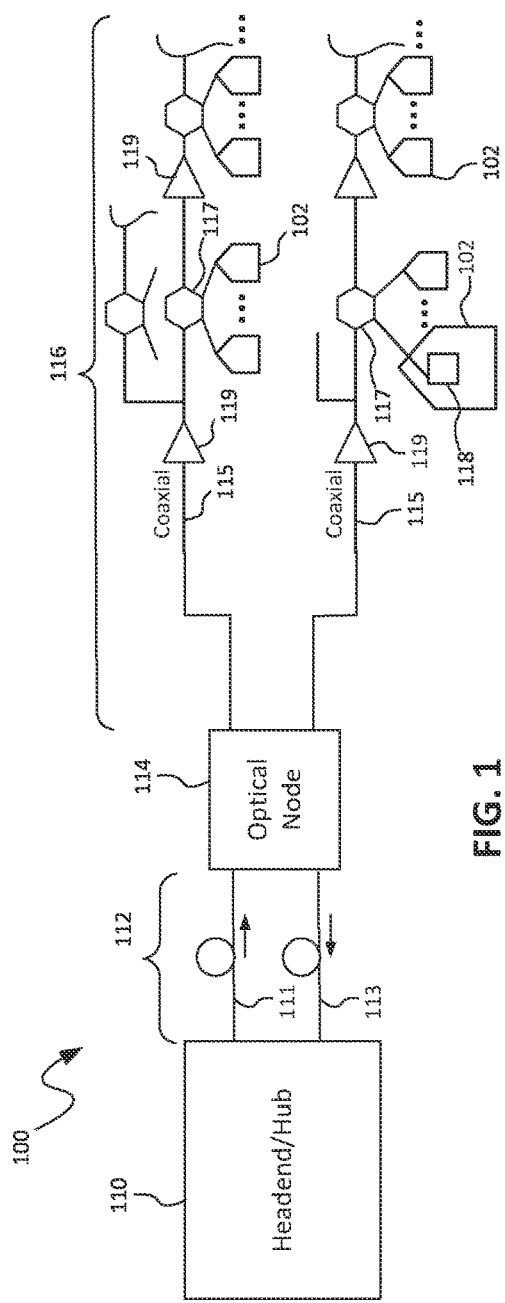
FIG. 1 is a schematic block diagram of a hybrid fiber-coaxial (HFC) network including RF amplifiers having a forward and reverse test point circuit with a switchable termination, consistent with embodiments of the present disclosure.

Referring to FIG. 1, an example of a CATV network 100 implementing RF amplifiers including a switchable forward and reverse test point circuit, consistent with embodiments of the present disclosure, is described in greater detail. In general, the CATV network 100 is a hybrid fiber-coaxial (HFC) network capable of delivering both cable television programming (i.e., video) and IP data services (e.g., internet and voice over IP) to customers or subscribers 102 through the same fiber optic cables and coaxial cables (i.e., trunk lines). Such a CATV network 100 is commonly used by service providers, such as Comcast Corporation, to provide combined video, voice and broadband internet services to the subscribers 102. Although example embodiments of CATV networks are described herein based on various standards (e.g., Data over Cable Service Interface Specification or DOCSIS), the concepts described herein may be applicable to other embodiments of CATV networks using other standards.

Multiple cable television channels and IP data services (e.g., broadband internet and voice over IP) may be delivered together simultaneously in the CATV network 100 by transmitting signals using frequency division multiplexing over a plurality of physical channels across a CATV channel spectrum. One example of the CATV downstream channel spectrum (also referred to as forward spectrum) includes channels from 650 MHz to 1794 MHz, but the CATV channel spectrum may be expanded even further to increase bandwidth for data transmission. In a CATV channel spectrum, some of the physical channels may be allocated for cable television channels and other physical channels may be allocated for IP data services. Other channel spectrums and bandwidths may also be used and are within the scope of the present disclosure.

In addition to the signals being carried downstream (also referred to as forward signals) to deliver the video and IP data to the subscribers 102, the CATV network 100 may also carry signals (e.g., IP data or control signals) upstream from the subscribers (also referred to as reverse signals), thereby providing bi-directional communication over the trunks. According to one example, the signal spectrum for the reverse signals carried upstream may be up to 600 MHz.

The CATV network 100 generally includes a headend/hub 110 connected via optical fiber trunk lines 112 to one or more optical nodes 114, which are connected via a coaxial cable distribution network 116 to customer premises equipment (CPE) 118 at subscriber locations 102. The headend/hub 110 receives, processes and combines the content (e.g., broadcast video, narrowcast video, and internet data) to be carried over the optical fiber trunk lines 112 as optical signals. The optical fiber trunk lines 112 include forward path optical fibers 111 for carrying downstream optical signals from the headend/hub 110 and return or reverse path optical fibers 113 for carrying upstream optical signals to the headend/hub 110. The optical nodes 114 provide an optical-to-electrical interface between the optical fiber trunk lines 112 and the coaxial cable distribution network 116. The optical nodes 114 thus receive downstream optical signals and transmit upstream optical signals and transmit downstream (forward) RF electrical signals and receive upstream (reverse) RF electrical signals.

The cable distribution network 116 includes coaxial cables 115 including trunk coaxial cables connected to the optical nodes 114 and feeder coaxial cables connected to the trunk coaxial cables. Subscriber drop coaxial cables are connected to the distribution coaxial cables using taps 117 and are connected to customer premises equipment 118 at the subscriber locations 102. The customer premises equipment 118 may include set-top boxes for video and cable modems for data. One or more line extender RF amplifiers 119 may also be coupled to the coaxial cables 116 for amplifying the forward signals (e.g., CATV signals) being carried downstream to the subscribers 102 and for amplifying the reverse signals being carried upstream from the subscribers 102. In this embodiment, the line extender RF amplifiers 119 may include at least one switchable forward and reverse test point circuit, as described herein.

Figure 2:
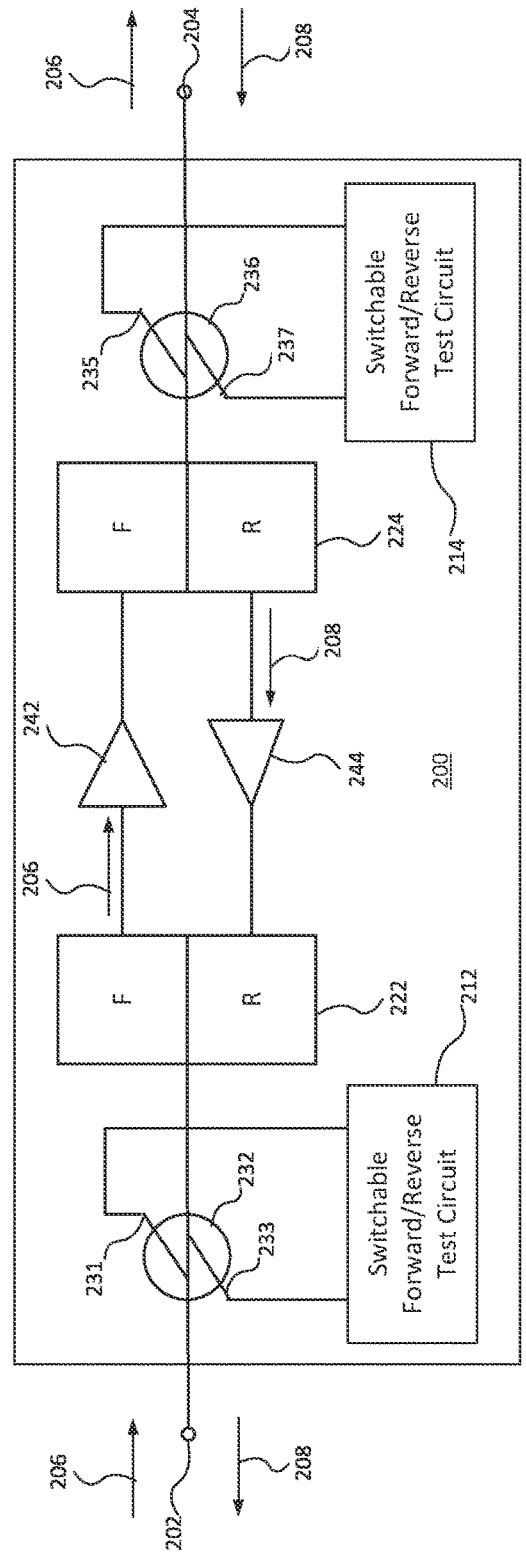
FIG. 2 is a schematic bock diagram of an RF amplifier including a forward and reverse test point circuit with a switchable termination, consistent with embodiments of the present disclosure.

Referring to FIG. 2, an embodiment of an RF amplifier 200 including a switchable forward and reverse test point circuit 212, 214, consistent with embodiments of the present disclosure, is shown and described in greater detail. The RF amplifier 200 may be configured to amplify forward RF signals at frequencies up to 1.8 GHz and to amplify reverse RF signals at frequencies up to 600 MHz. The RF amplifier 200 may be a line extender RF amplifier such as the line extender RF amplifier 119 used in the CATV network 100 described above.

The RF amplifier 200 includes first and second ports 202, 204 configured to be coupled to an electrical path carrying forward and reverse RF signals 206, 208, such as the coaxial cable 115 carrying forward RF signals downstream and carrying reverse RF signals upstream in the CATV network 100. The first port 202 provides an input for forward signals 206 and an output for reverse signals 208, and the second port 204 provides an input for reverse signals 208 and an output for forward signals 206.

The RF amplifier 200 further includes a first diplex filter 222 coupled to the port 202, a second diplex filter 224 coupled to the port 204, and forward and reverse gain stages 242, 244 coupled between the diplex filters 222, 224. The diplex filters 222, 224 separate the forward and reverse signals that travel on the same electrical path at the ports 202, 204. The first diplex filter 222 separates and passes the forward signals 206 received on the first port 202 for amplification by the forward gain stage 242, and the second diplex filter 224 separates and passes the reverse signals 208 received on the second port 204 for amplification by the reverse gain stage 244. The diplex filters and gain stages may be implemented using known circuit components in RF amplifiers.

In the illustrated embodiment, a first directional coupler 232 couples a first switchable forward and reverse test point circuit 212 to the first port 202 and a second directional coupler 234 couples the second switchable forward and reverse test point circuit 214 to the second port 204. The directional couplers 232, 234 split off a portion of the forward and reverse signals to be tested. The first directional coupler 232 includes a forward terminal 231 and a reverse terminal 233, and the first forward and reverse test point circuit 212 selectably couples the forward terminal 231 and the reverse terminal 233 between at least one test point and a termination, as will be described in greater detail below. Thus, the first switchable forward and reverse test point circuit 212 allows testing of the forward signal 206 before amplification and allows testing of the reverse signal 208 after amplification. The second directional coupler 236 includes a forward terminal 235 and a reverse terminal 237, and the second forward and reverse test point circuit 214 selectably couples the forward terminal 235 and the reverse terminal 237 between at least one test point and a termination, as will be described in greater detail below. Thus, the second switchable forward and reverse test point circuit 214 allows testing of the forward signal 206 after amplification and allows testing of the reverse signal 208 before amplification. In other embodiments, an RF amplifier may include only one directional coupler and switchable forward and reverse test point circuit.

The switchable forward/reverse test circuits 212, 214 may include a switchable termination circuit coupled between the forward and reverse terminals of the directional couplers 232, 236 and at least one test point. FIGS. 3-6 illustrate various embodiments of switchable termination circuits 300, 400, 500, 600 that may be used in the switchable forward/reverse test circuits 212, 214 described above. The switchable termination circuits 300, 400, 500, 600 include one or more self-terminating switches coupled between forward and reverse terminals of the directional coupler and at least one test point. A self-terminating switch allows one of the terminals of the directional coupler to be terminated when not in use (i.e., when the signal on the other terminal is being tested). By terminating the terminal that is not in use, the test circuit may be capable of handling higher RF signal frequencies, for example, reverse signal frequencies up to 600 MHz.

The switchable termination circuits 300, 400, 500, 600 may also include at least one attenuation and tilt network coupled between the directional coupler and at least one test point. As used in this context, the term "network" refers to a group or system of electronic components and connecting circuitry designed to function in a specific matter. An attenuation and tilt network includes electronic components (e.g., resistors, capacitors, and inductors) and connecting circuitry to provide any required attenuation and to compensate for tilt on the terminals of the directional coupler. An attenuation and tilt network may include, for example, a bridged-T network such as the type described in U.S. Pat. No. 6,769,133, which is incorporated herein by reference. Other arrangements of resistors, capacitors and/or inductors known to those skilled in the art to provide attenuation and tilt compensation are also within the scope of the present disclosure.

Figures 3, 4:
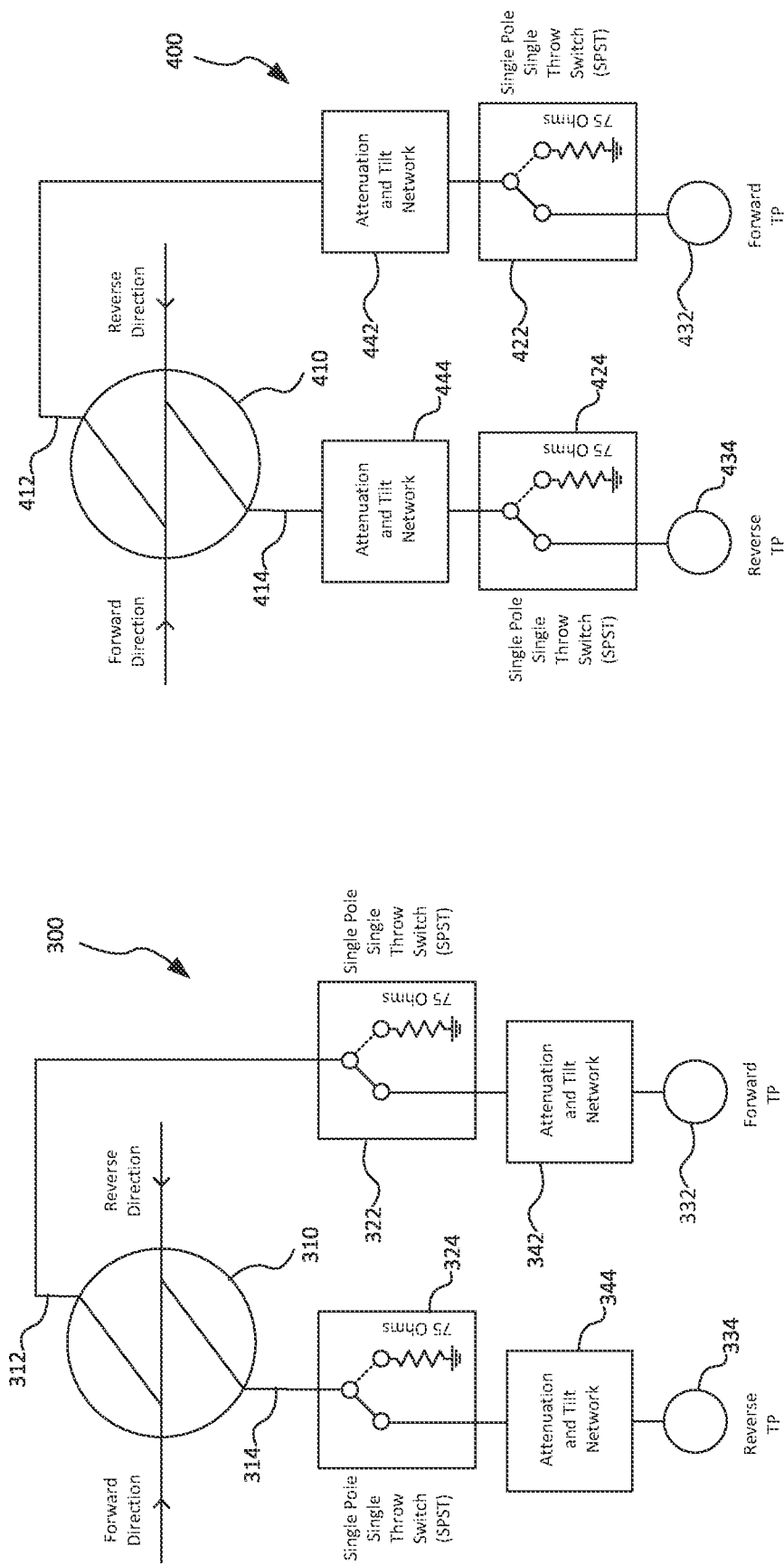
FIG. 3 is a schematic block diagram of an embodiment of a forward and reverse test point circuit with a switchable termination, which may be used in the RF amplifier.
FIG. 4 is a schematic block diagram of another embodiment of a forward and reverse test point circuit with a switchable termination, which may be used in the RF amplifier.

In FIG. 3, a switchable termination circuit 300 includes a forward self-terminating switch 322 coupled between a forward terminal 312 of a directional coupler 310 and a forward test point 332 and includes a reverse self-terminating switch 324 coupled between a reverse terminal 314 of the directional coupler 310 and a reverse test point 334. The forward and reverse self-terminating switches 322, 324 may be a single pole single throw (SPST) switch with a terminating resistor (e.g., 75 Ohms). In this embodiment, a forward attenuation and tilt network 342 is coupled between the forward self-terminating switch 322 and the forward test point 332, and a reverse attenuation and tilt network 344 is coupled between the reverse self-terminating switch 324 and the reverse test point 334. During testing of a forward signal, the forward self-terminating switch 322 is switched to connect the forward terminal 312 of the directional coupler 310 to the forward attenuation and tilt network 342 and forward test point 332 and the reverse self-terminating switch 324 is switched to the terminating resistor. During testing of a reverse signal, the reverse self-terminating switch 324 is switched to connect the reverse terminal 314 of the directional coupler 310 to the reverse attenuation and tilt network 344 and reverse test point 334 and the forward self-terminating switch 322 is switched to the terminating resistor.

In FIG. 4, a switchable termination circuit 400 similarly includes a forward self-terminating switch 422 (e.g., an SPST switch) coupled between a forward terminal 412 of a directional coupler 410 and a forward test point 432 and includes a reverse self-terminating switch 424 (e.g., an SPST switch) coupled between a reverse terminal 414 of the directional coupler 410 and a reverse test point 434. In FIG. 4, however, a forward attenuation and tilt network 442 and a reverse attenuation and tilt network 444 are coupled before the forward self-terminating switch 422 and the reverse self-terminating switch 424, respectively. During testing of a forward signal, the forward self-terminating switch 422 is switched to connect the forward terminal 412 of the directional coupler 410 to the forward test point 432 and the reverse self-terminating switch 424 is switched to the terminating resistor. During testing of a reverse signal, the reverse self-terminating switch 424 is switched to connect the reverse terminal 414 of the directional coupler 410 to the reverse test point 434 and the forward self-terminating switch 422 is switched to the terminating resistor.

Figure 5:
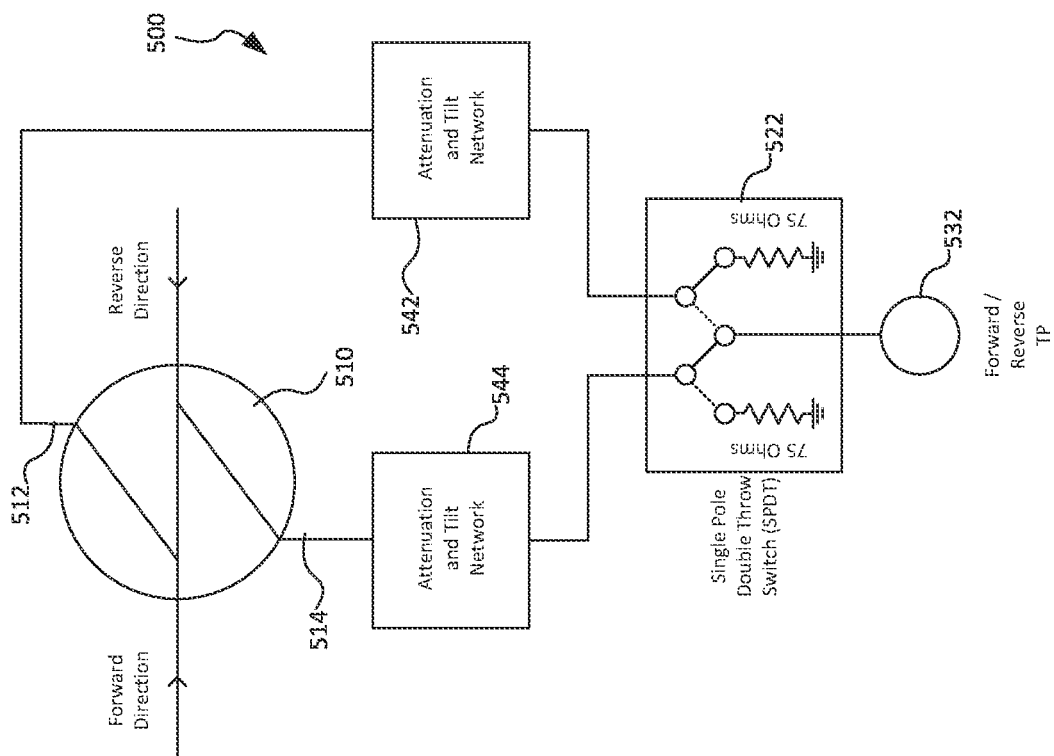
FIG. 5 is a schematic block diagram of a further embodiment of a forward and reverse test point circuit with a switchable termination, which may be used in the RF amplifier.

In FIG. 5, a switchable termination circuit 500 includes a self-terminating switch 522 coupled between both forward and reverse terminals 512, 514 of a directional coupler 510 and a single forward and reverse test point 532. In this embodiment, the self-terminating switch 522 may be a single pole double throw (SPDT) switch with terminating resistors (e.g., 75 Ohms). Forward and reverse attenuation and tilt networks 542, 544 are coupled between the respective forward and reverse terminals 512, 514 and the self-terminating switch 522. During testing of a forward signal, the self-terminating switch 522 is switched to connect the forward terminal 512 of the directional coupler 510 to the test point 532 and the reverse terminal 514 is switched to the terminating resistor. During testing of a reverse signal, the self-terminating switch 522 is switched to connect the reverse terminal 514 of the directional coupler 510 to the test point 532 and the forward terminal is switched to the terminating resistor. Thus, the single test point 532 may be used to test both forward and reverse signals with fewer components.

Figure 6:
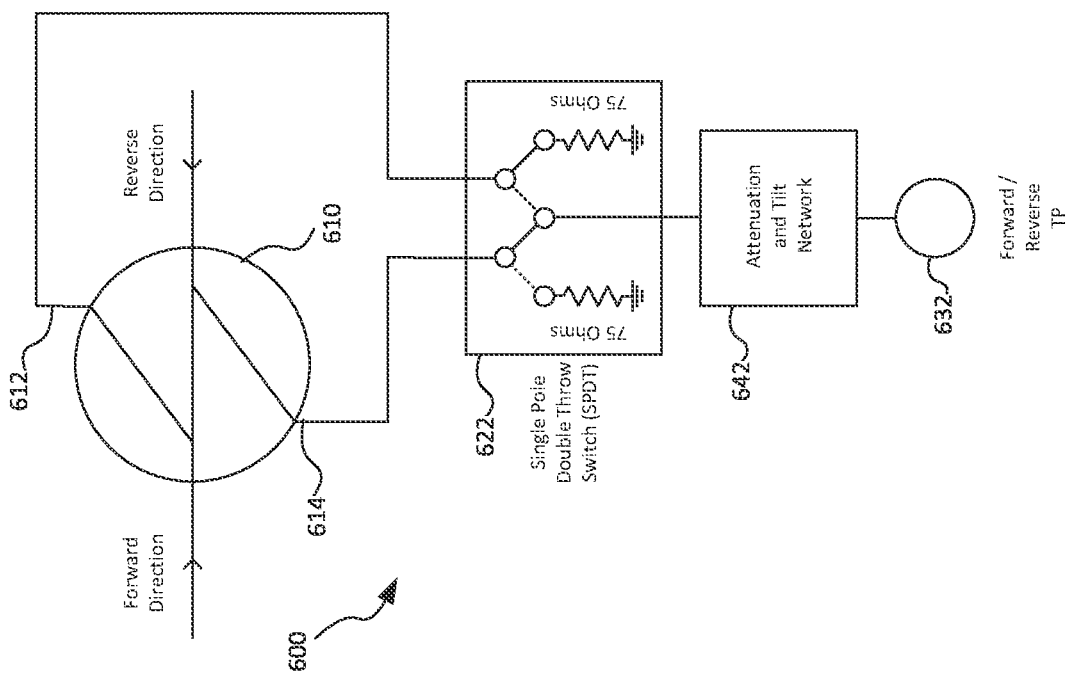
FIG. 6 is a schematic block diagram of yet another embodiment of a forward and reverse test point circuit with a switchable termination, which may be used in the RF amplifier.

In FIG. 6, a switchable termination circuit 600 similarly includes a self-terminating switch 622 coupled between both forward and reverse terminals 612, 614 of a directional coupler 610 and a single forward and reverse test point 632. In this embodiment, however, a single attenuation and tilt network 642 is coupled between the self-terminating switch 622 and the single test point 632, even further reducing the number of components. Similar to the embodiment in FIG. 5, the self-terminating switch 622 may be an SPDT switch with terminating resistors (e.g., 75 Ohms). During testing of a forward signal, the self-terminating switch 622 is switched to connect the forward terminal 612 of the directional coupler 610 to the test point 632 and the reverse terminal 614 is switched to the terminating resistor. During testing of a reverse signal, the self-terminating switch 622 is switched to connect the reverse terminal 614 of the directional coupler 610 to the test point 632 and the forward terminal is switched to the terminating resistor.

Although the self-terminating switches 322, 324, 422, 424, 522, 622 are shown as internally terminated switches, the switchable termination circuits 300, 400, 500, 600 may also be implemented with external terminations on the switches. For example, the SPST switches in the switchable termination circuits 300, 400 may be SPDT switches with one leg of the switch being terminated externally. Other configurations of the switchable termination circuits are also contemplated and within the scope of the present disclosure.

Accordingly, a switchable forward and reverse test point circuit, consistent with embodiments described herein, may be used in an RF amplifier to allow testing of both forward and reverse signals before and/or after amplification. The switchable forward and reverse test point circuit uses a switchable termination circuit to allow the testing with higher frequencies, particular, for the reverse signals and with a reduction in circuit components.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A switchable forward and reverse test point circuit comprising:
    a directional coupler configured to be coupled to an electrical path on which both forward and reverse RF signals travel, the directional coupler including a forward terminal configured to split off a portion of the forward RF signal and a reverse terminal configured to split off a portion of the reverse RF signal;
    a test point configured to provide access to at least one of the forward and reverse signals via the forward and reverse terminals;
    a switchable termination circuit coupled between the forward and reverse terminals of the directional coupler and the at least one test point, wherein the switchable termination circuit is configured, during forward signal testing, to switch the forward terminal to the test point and to switch the reverse terminal to a termination, and wherein the switchable termination circuit is configured, during reverse signal testing, to switch the reverse terminal to the test point and to switch the forward terminal to a termination; and
    wherein the test point includes a single forward and reverse test point, and wherein the switchable termination circuit includes a self-terminating switch coupled between the reverse terminal and the forward terminal of the directional coupler and the single forward and reverse test point.

2. The switchable forward and reverse test point circuit of claim 1, further including a forward attenuation and tilt network coupled between the forward terminal of the directional coupler and the self-terminating switch and a reverse attenuation and tilt network coupled between the reverse terminal of the directional coupler and the self-terminating switch.

3. The switchable forward and reverse test point circuit of claim 1, further including an attenuation and tilt network coupled between the self-terminating switch and the single forward and reverse test point.

4. The switchable forward and reverse test point circuit of claim 1, wherein the self-terminating switch includes a single pole double throw (SPDT) switch.

5. An RF amplifier for a communication system that transmits forward and reverse RF signals, the RF amplifier comprising:
    a first port for receiving a forward signal and for outputting a reverse signal;
    a second port for outputting the forward signal and for receiving the reverse signal;
    a first diplex filter coupled to the first port for filtering signals at the first port to separate the forward signal for amplification;
    a second diplex filter coupled to the second port for filtering signals at the second port to separate the reverse signal for amplification;
    a first gain stage coupled between the first and second diplex filters for amplifying the forward signal;
    a second gain stage coupled between the first and second diplex filters for amplifying the reverse signal;
    at least one directional coupler coupled to at least one of the first port and the second port;
    at least one switchable forward and reverse test point circuit coupled to forward and reverse terminals of the directional coupler, the switchable forward and reverse test point circuit comprising a test point and a switchable termination circuit configured to switch the forward and reverse terminals of the directional coupler between a termination and the test point; and
    wherein the test point includes a single forward and reverse test point, and wherein the switchable termination circuit includes a self-terminating switch coupled between the reverse terminal and the forward terminal of the directional coupler and the single forward and reverse test point.

6. The RF amplifier of claim 5, wherein the at least one directional coupler includes a first directional coupler coupled to the first port and a second directional coupler coupled to the second port, and wherein the at least one switchable forward and reverse test point circuit includes a first switchable forward and reverse test point circuit coupled to the forward and reverse terminals of the first coupler, and a second switchable forward and reverse test point circuit coupled to the forward and reverse terminals of the second coupler.

7. The RF amplifier of claim 5, wherein the self-terminating switch includes a single pole double throw (SPDT) switch.

8. The RF amplifier of claim 5, wherein switchable forward and reverse test point circuit further includes at least one attenuation and tilt network.

9. The RF amplifier of claim 5, wherein the RF amplifier is configured to amplify forward RF signals at frequencies up to 1.8 GHz and to amplify reverse RF signals at frequencies up to 600 MHZ.

* * * * *

UNITED STATES PATENT AND TRADEMARK OFFICE
CERTIFICATE OF CORRECTION

Page 1 of 1

PATENT NO. : 12,126,388 B2
APPLICATION NO. : 17/901282
DATED : October 22, 2024
INVENTOR(S) : Blashewski It is certified that error appears in the above-identified patent and that said Letters Patent is hereby corrected as shown below:

In the Claims

In Column 7, Line 38, in Claim 1, before "signals" insert --RF--.

Signed and Sealed this
Twelfth Day of August, 2025

Coke Morgan Stewart
*Acting Director of the United States Patent and Trademark Office*